(12) United States Patent
Zhang et al.

(10) Patent No.: US 10,652,130 B2
(45) Date of Patent: *May 12, 2020

(54) HANDLING OF INTERMITTENT DISCONNECTION IN A MILLIMETER WAVE (MMW) SYSTEM

(71) Applicant: MEDIATEK Singapore Pte. Ltd., Singapore (SG)

(72) Inventors: Yuanyuan Zhang, Beijing (CN); Chia-Hao Yu, Yilan County (TW); Yu-Syuan Jheng, Taipei (TW); Aimin Justin Sang, San Diego, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,986

(22) Filed: Mar. 1, 2019

(65) Prior Publication Data

US 2019/0199615 A1 Jun. 27, 2019

Related U.S. Application Data

(63) Continuation of application No. 15/232,217, filed on Aug. 9, 2016, now Pat. No. 10,257,070, which is a (Continued)

(51) Int. Cl.
*H04L 12/26* (2006.01)
*H04B 7/06* (2006.01)
(Continued)

(52) U.S. Cl.
CPC .......... *H04L 43/16* (2013.01); *H04B 7/0617* (2013.01); *H04B 7/0695* (2013.01);
(Continued)

(58) Field of Classification Search
CPC ..... H04B 7/0617; H04B 7/0695; H04L 43/16; H04W 16/28; H04W 16/32;
(Continued)

(56) References Cited

U.S. PATENT DOCUMENTS 8,165,595 B2    4/2012   Xia et al. .................. 455/452.2
9,763,283 B2    9/2017   Jung et al.
(Continued)

FOREIGN PATENT DOCUMENTS

CN      103718591 A       4/2014
WO      WO2010052519 A1   5/2010
(Continued)

OTHER PUBLICATIONS

International Search Report and Written Opinion of International Search Authority for PCT/CN2015/073047 dated Nov. 9, 2015(11 pages).

(Continued)

*Primary Examiner* — Ahmed Elallam
(74) *Attorney, Agent, or Firm* — Imperium Patent Works; Helen Mao

(57) ABSTRACT

Apparatus and methods are provided to handle the intermittent disconnections in an mmW system. In one novel aspect, the beam tracking failure is determined upon detection of one or more tracking failure conditions. In one embodiment, the UE further considers potential recoveries to avoid frequent triggering of the beam-tracking failure condition. In another novel aspect, the UE performs one or more recovery procedures based on one or more recovery conditions. In one embodiment, the UE performs the initial alignment procedure to recover the connection. In another embodiment, the UE performs the beam-switching request procedure before triggers the initial alignment procedure. In one embodiment, timers are used to supervise the recovery procedures. In
(Continued)

another embodiment, macro-assisted procedures are used for the beam-switching request procedure. In yet another novel aspect, the UE performs reestablishment of a new connection at the upper layer upon receiving the beam-tracking failure indicator.

17 Claims, 8 Drawing Sheets

Related U.S. Application Data continuation of application No. PCT/CN2015/073047, filed on Feb. 13, 2015.

(51) Int. Cl.
| | | |
|---|---|---|
| *H04W 16/28* | (2009.01) | |
| *H04W 72/08* | (2009.01) | |
| *H04W 74/08* | (2009.01) | |
| *H04W 76/18* | (2018.01) | |
| *H04W 16/32* | (2009.01) | |
| *H04W 76/19* | (2018.01) | |

(52) U.S. Cl.
CPC ......... *H04W 16/28* (2013.01); *H04W 72/085* (2013.01); *H04W 74/0833* (2013.01); *H04W 76/18* (2018.02); *H04W 16/32* (2013.01); *H04W 76/19* (2018.02)

(58) Field of Classification Search
CPC ........... H04W 72/085; H04W 74/0833; H04W 76/18; H04W 76/19
See application file for complete search history.

(56) References Cited

U.S. PATENT DOCUMENTS

| | | | | |
|---|---|---|---|---|
| 9,853,707 | B2* | 12/2017 | Yu | H04B 7/0626 |
| 9,961,565 | B2* | 5/2018 | Roy | H04W 16/28 |
| 10,257,070 | B2* | 4/2019 | Zhang | H04L 43/16 |
| 10,512,008 | B2* | 12/2019 | Deenoo | H04W 8/22 |
| 2009/0233545 | A1 | 9/2009 | Sutskover et al. | 455/25 |
| 2011/0002373 | A1 | 1/2011 | Jeon | 375/228 |
| 2011/0211490 | A1 | 9/2011 | Nikula et al. | 370/328 |
| 2011/0274054 | A1 | 11/2011 | Cordeiro | 370/329 |
| 2012/0052828 | A1 | 3/2012 | Kamel et al. | 455/226.2 |
| 2013/0021952 | A1 | 1/2013 | Jeong et al. | 370/277 |
| 2013/0182683 | A1 | 7/2013 | Seol et al. | 370/335 |
| 2014/0016573 | A1 | 1/2014 | Nuggelhalli et al. | 370/329 |
| 2014/0072078 | A1 | 3/2014 | Sergeyev et al. | 375/316 |
| 2014/0177607 | A1 | 6/2014 | Li et al. | 370/336 |
| 2015/0215077 | A1 | 7/2015 | Ratasuk et al. | 455/436 |
| 2015/0230263 | A1 | 8/2015 | Roy et al. | 455/452.2 |
| 2015/0382268 | A1 | 12/2015 | Hampel et al. | 455/436 |
| 2016/0095102 | A1 | 3/2016 | Yu et al. | 455/452.2 |
| 2016/0099763 | A1 | 4/2016 | Chen | 370/329 |
| 2016/0135102 | A1 | 5/2016 | Gunnarsson et al. | 455/437 |
| 2016/0183242 | A1 | 6/2016 | Cordeiro et al. | 370/331 |
| 2016/0190686 | A1 | 6/2016 | Gao et al. | 342/374 |
| 2016/0192433 | A1* | 6/2016 | Deenoo | H04W 72/046 370/329 |
| 2016/0294462 | A1 | 10/2016 | Jeong et al. | 375/267 |
| 2016/0337916 | A1* | 11/2016 | Deenoo | H04W 8/22 |
| 2017/0033854 | A1* | 2/2017 | Yoo | H04W 24/00 |
| 2017/0195022 | A1 | 7/2017 | Wen et al. | |

FOREIGN PATENT DOCUMENTS

| | | |
|---|---|---|
| WO | WO2014018052 A1 | 1/2014 |
| WO | WO2014035281 A1 | 3/2014 |
| WO | WO2014036150 A1 | 3/2014 |
| WO | WO2014172306 A2 | 10/2014 |
| WO | WO2014198318 A1 | 12/2014 |

OTHER PUBLICATIONS

Jeong et al., Random Access in Millimeter-Wave Beamforming Cellular Networks: Issue and Approaches, IEE Communications Magazinel * Jan. 2015, pp. 180-185.
EPO, Search Report for the EP patent application 15881565.4 dated May 17, 2017 (8 pages).
EPO, Search Report for the EP patent application 15881565.4 dated May 31, 2018 (6 pages).

* cited by examiner

HANDLING OF INTERMITTENT DISCONNECTION IN A MILLIMETER WAVE (MMW) SYSTEM

CROSS REFERENCE TO RELATED APPLICATIONS

This application is a continuation, and claims priority under 35 U.S.C. § 120 from nonprovisional U.S. patent application Ser. No. 15/232,217, entitled "CELL SELECTION AND RESELECTION FOR LOW COST MACHINE-TYPE COMMUNICATION UE," filed on Aug. 9, 2016, the subject matter of which is incorporated herein by reference. U.S. application Ser. No. 15/232,217, in turn, is a continuation, and claims priority under 35 U.S.C. § 120 and § 365(c) from International Application No. PCT/CN2015/073047, with an international filing date of Feb. 13, 2015. The disclosure of each of the foregoing documents is incorporated herein by reference.

TECHNICAL FIELD

The disclosed embodiments relate generally to wireless communication, and, more particularly, to intermittent disconnection handling in a millimeter wave (mmW) system.

BACKGROUND

The bandwidth shortage increasingly experienced by mobile carriers has motivated the exploration of the underutilized millimeter wave (mmW) frequency spectrum between 3 G and 300 G Hz for the next generation broadband cellular communication networks. The available spectrum of mmW band is two hundred times greater than the conventional cellular system. The mmW wireless network uses directional communications with narrow beams and can support multi-gigabit data rate. The underutilized bandwidth of the mmW spectrum has wavelengths ranging from 1 mm to 100 mm. The very small wavelengths of the mmW spectrum enable large number of miniaturized antennas to be placed in a small area. Such miniaturized antenna system can produce high beamforming gains through electrically steerable arrays generating directional transmissions.

With recent advances in mmW semiconductor circuitry, mmW wireless system has become a promising solution for the real implementation. However, the heavy reliance on directional transmissions and the vulnerability of the propagation environment present particular challenges for the mmW network. For example, mmW channel changes much faster than today's cellular system due to the small coherence time, which is about hundreds of microseconds. The mmW communication depends extensively on adaptive beamforming at a scale that far exceeds current cellular system. Further, the high reliance on the directional transmission introduces new issues for synchronization. Broadcast signals may delay the base station detection during cell search for initial connection setup and for handover because both the base station and the mobile station need to scan over a range of angles before the mobile station can detect the base station. Furthermore, mmW signals are extremely susceptible to shadowing. The appearance of obstacles, such as human bodies and outdoor materials would cause the signal outage. The small coverage of the cell causes the relative path loss and the cell association to change rapidly. Resolving frequent intermittent connectivity loss and enabling rapid adaptable communication is one of the key features of the development of the mmW wireless network.

Improvements and enhancements are required for intermittent disconnection handling for the mmW wireless network.

SUMMARY

Apparatus and methods are provided to handle the intermittent disconnections in an mmW system. In one novel aspect, the beam tracking failure is determined upon detection of one or more tracking failure conditions. In one embodiment, the tracking is considered as failed when one or more predefined failure events occur for the first number of consecutive times or when one or more predefined failure events occur for the second number of times. In another embodiment, the UE further considers potential recoveries to avoid frequent triggering of the beam-tracking failure condition. In one embodiment, the beam tracking is considered as recovered when one or more predefined recovery events occur for the third number of consecutive times or when one or more predefined recovery events occur for the fourth number of times.

In another novel aspect, the UE performs one or more recovery procedures based on one or more recovery conditions. In one embodiment, the UE performs the initial alignment procedure to recover the connection. In one embodiment, the initial beam alignment procedure uses the dedicated resource if it is available. If no dedicated resource is available, the UE performs the initial alignment procedure using the random access (RA) procedure. In yet another embodiment, a beam-alignment timer is used to supervise the initial beam alignment procedure. If the beam-alignment timer expires and the UE cannot acquire a good control beam of a serving cell, the UE terminates the initial beam alignment procedure and sends the beam-tracking failure indication to the upper layer.

In another embodiment, the UE performs the beam-switching request procedure before triggering the initial alignment procedure. The UE selects one or more control beams; each satisfies one or more predefined criterion. In one embodiment, a beam-switching timer is used to supervise the beam-switching request procedure. If the beam-switching timer is expired and the UE failed to receive a beam-switching response, the UE terminates the beam-switching request procedure and starts the initial beam alignment procedure. In yet another embodiment, macro-assisted beam-switching procedure is used when the UE is configured with dual connectivity. The UE sends beam-switching related information to the serving macro eNB. The macro eNB forwards the received information to the mmW eNB to help the mmW eNB to receive the request timely and reliably. The UE subsequently sends beam-switching request to mmW eNB.

In yet another novel aspect, the UE performs reestablishment of a new connection at the upper layer upon receiving the beam-tracking failure indication. In one embodiment, the UE is connected with a standalone mmW system. The beam-tracking failure indicator is a trigger event for the RRC connection re-establishment. In one embodiment, there is no macro layer configured for the UE. The UE performs the RRC connection re-establishment towards an mmW cell. In another embodiment, if there is macro layer available, the UE performs RRC connection re-establishment towards the macro cell, which is considered as the default candidate cell for RRC connection re-establishment. If dual connectivity is configured for the UE with macro layer, the UE will fall back to the macro layer upon detecting beam-tracking failure indication. Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
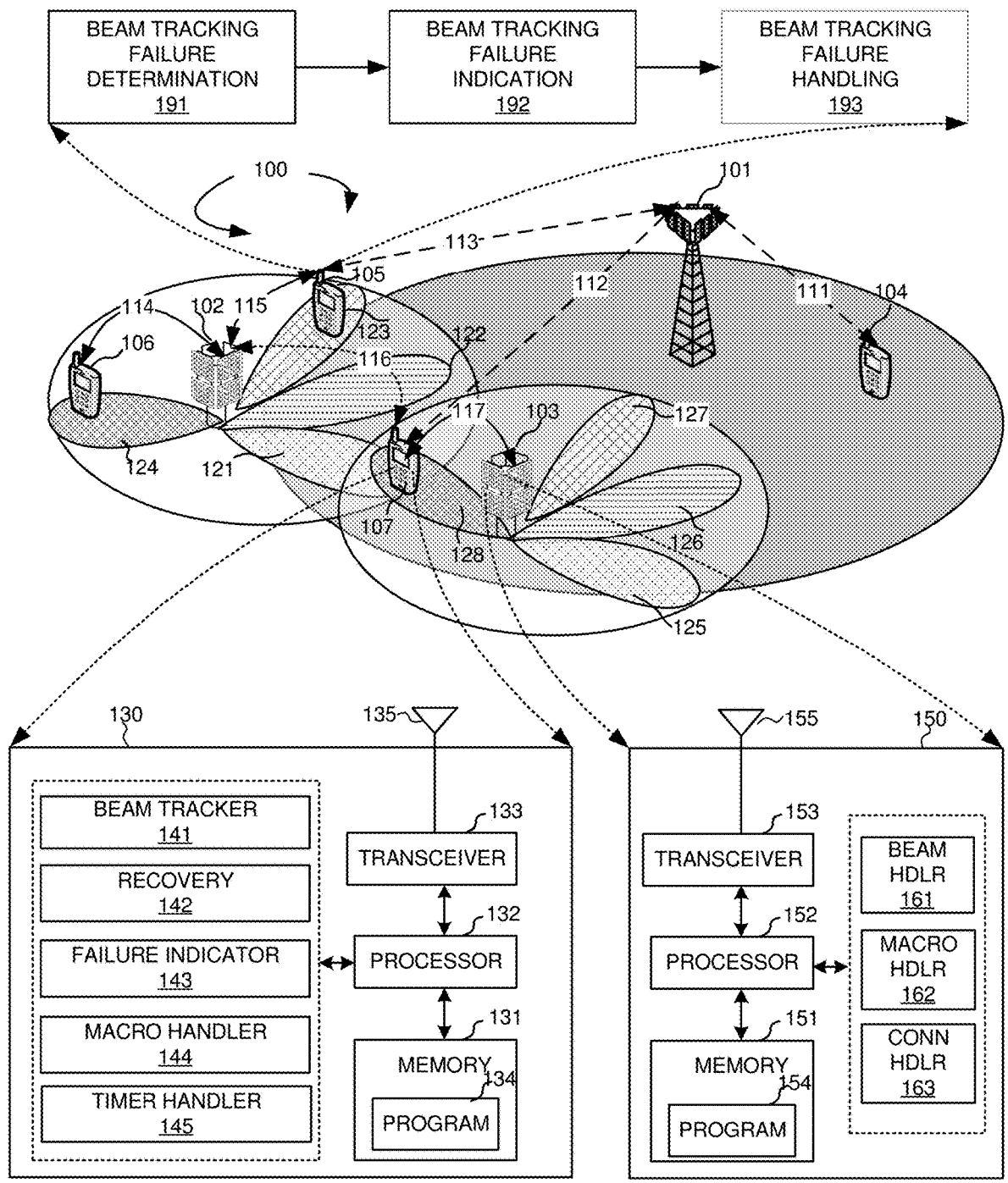
FIG. 1 is a schematic system diagram illustrating an exemplary wireless network with mmW connections in accordance with embodiments of the current invention.

FIG. 1 is a schematic system diagram illustrating an exemplary wireless network 100 with mmW connections in accordance with embodiments of the current invention. Wireless system 100 includes one or more fixed base infrastructure units forming a network distributed over a geographical region. The base unit may also be referred to as an access point, an access terminal, a base station, a Node-B, an eNode-B, or by other terminology used in the art. As an example, base stations 101, 102 and 103 serve a number of mobile stations 104, 105, 106 and 107 within a serving area, for example, a cell, or within a cell sector. In some systems, one or more base stations are coupled to a controller forming an access network that is coupled to one or more core networks. eNB 101 is a conventional base station served as a macro eNB. eNB 102 and eNB 103 are mmW base station, the serving area of which may overlap with serving area of eNB 101, as well as may overlap with each other at the edge. If the serving area of mmW eNB does not overlap the serving area of macro eNB, the mmW eNB is considered as standalone, which can also provide service to users without the assistance of macro eNB. mmW eNB 102 and mmW eNB 103 has multiple sectors each with multiple control beams to cover a directional area. Control beams 121, 122, 123 and 124 are exemplary control beams of eNB 102. Control beams 125, 126, 127 and 128 are exemplary control beams of eNB 103. As an example, UE or mobile station 104 is only in the service area of eNB 101 and connected with eNB 101 via a link 111. UE 106 is connected with mmW network only, which is covered by control beam 124 of eNB 102 and is connected with eNB 102 via a link 114. UE 105 is in the overlapping service area of eNB 101 and eNB 102. In one embodiment, UE 105 is configured with dual connectivity and can be connected with eNB 101 via a link 113 and eNB 102 via a link 115 simultaneously. UE 107 is in the service areas of eNB 101, eNB 102, and eNB 103. In embodiment, UE 107 is configured with dual connectivity and can be connected with eNB 101 with a link 112 and eNB 103 with a link 117. In embodiment, UE 107 can switch to a link 116 connecting to eNB 102 upon connection failure with eNB 103.

FIG. 1 further illustrates simplified block diagrams 130 and 150 for UE 107 and eNB 103, respectively. Mobile station 107 has an antenna 135, which transmits and receives radio signals. A RF transceiver module 133, coupled with the antenna, receives RF signals from antenna 135, converts them to baseband signal, and sends them to processor 132. RF transceiver module 133 is an example, and in one embodiment, the RF transceiver module comprises two RF modules (not shown), first RF module is used for mmW transmitting and receiving, and another RF module is used for different frequency bands transmitting and receiving which is different from the mmW transceiving. RF transceiver 133 also converts received baseband signals from processor 132, converts them to RF signals, and sends out to antenna 135. Processor 132 processes the received baseband signals and invokes different functional modules to perform features in mobile station 107. Memory 131 stores program instructions and data 134 to control the operations of mobile station 107. Mobile station 107 also includes multiple function modules that carry out different tasks in accordance with embodiments of the current invention. A beam tracker 141 determines a beam tracking failure upon detection of one or more tracking failure conditions. A recovery module 142 performs one or more recovery procedures based on one or more recovery conditions. A failure indicator handler 143 sends a failure indication to an upper layer upon concluding a failure of the one or more recovery procedures. In one example, a macro layer handler 144 establishes RRC connection with a macro layer of the UE as one recovery procedure when the UE are configured with dual connection with a macro cell and another cell. Macro layer handler 144 also corresponds with a macro eNB when the UE is configured with dual connectivity. In one embodiment, UE 107 comprises Timer handler module 145, for processing the timers in the beam tracking, recovery, failure indication, and beam switching, etc.

Similarly, eNB 103 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 103. Memory 151 stores program instructions and data 154 to control the operations of eNB 103. eNB 103 also includes multiple function modules that carry out different tasks in accordance with embodiments of the current invention. A beam handler 161 handles beam switching and beam alignment procedures. A macro handler 162 communicates with a configured macro eNB to get beam-switching request related information. A connection module 163 handles connection and reconnection requests from the UE.

FIG. 1 further shows functional procedures that handle intermittent disconnections of the mmW system. UE 105 has a beam-tracking failure determination procedure 191, a beam-tracking failure indication procedure 192, and a beam-tracking failure handling procedure 193.

In one novel aspect, beam-tracking failure determination procedure 191 monitors and determines beam-tracking failures based on one or more detected beam-tracking failure conditions. The beam-tracking failure is determined if the link quality of the serving control beam is too bad to maintain connectivity for an evaluation period. In one embodiment, the beam tracking is considered as failed when one or more predefined failure events occur for a predefined number of consecutive times. For example, a failure event is consecutively detected twenty times during forty milliseconds. In another embodiment, the beam tracking is considered as failed when one or more predefined failure events occur for a predefined number of times. For example, a failure event is detected ten times during twenty milliseconds. The failure events include fail to receive one or more unicast transport blocks, a measured channel status indicator (CSI) or a channel quality (CQI) indicator is lower than a predefined quality threshold, a measured signal strength or quality is lower than a predefined signal threshold, and one generated Qout reusing current radio link monitoring procedure. In one embodiment, the failure events are detected by lower layers of the UE. Other mmW link related measurements and/or mmW system tracking indicators can also be configured to be beam-tracking failure events. Such failure events can be preconfigured by the UE or the network. The failure events can also be dynamically updated.

In another novel aspect, beam-tracking failure determination procedure 191 further considers potential recoveries to avoid frequent triggering of the beam-tracking failure condition. In one embodiment, the beam tracking is considered as recovered when one or more predefined recovery events occur for a predefined number of consecutive times. In another embodiment, the beam tracking is considered as recovered when one or more predefined recovery events occur for a predefined number of times. The recovery events include successfully receiving one or more unicast transport blocks, a CSI or CQI indicator is higher than a predefined quality threshold, a measured signal strength or quality is higher than a predefined signal threshold, and one generated Qin reusing current radio link monitoring procedure. In one embodiment, the recovery events are detected by lower layers of the UE. Other mmW link related measurements and/or mmW system tracking indicators can also be configured to be beam-tracking recovery events. Such recovery events can be preconfigured by the UE or the network. The recovery events can also be dynamically updated. In one embodiment, the predefined quality threshold for the failure event is the same as the predefined quality threshold for the recovery event. In another embodiment, the predefined quality threshold for the failure event is different from the predefined quality threshold for the recovery event. Similarly, the predefined strength threshold for the failure event is the same as the predefined strength threshold for the recovery event in one embodiment, while the predefined strength threshold for the failure event is different from the predefined strength threshold for the recovery event in another embodiment.

Upon determination of the beam-tracking failure condition, the UE would forward a beam-tracking failure indication to upper layers of the UE. In one novel aspect, beam-tracking failure indication procedure 192 performs recovery procedures before sending the beam-tracking failure indicator to upper layers of the UE.

In one embodiment, the initial beam alignment procedure is performed to recover the link. The initial beam alignment is performed with the serving cell of the UE to acquire a beam of the serving cell for communication. The initial beam alignment procedure sets the initial establishment of beamforming parameters at both the base station and the UE for subsequent communication. A beam searching is performed based on reference signal (RS) transmission. The RS can be a downlink (DL) RS or an uplink (UL) RS. The DL reference signal needs a UL feedback channel to indicate reception situation. This implementation is beneficial for the UE power consumption and can be used for multi-user training by same transmissions. The UL reference signal option is less UE power friendly. The UL RS option reduces training latency when the UE is equipped with multiple transceiver chains.

In one embodiment, an initial-alignment timer is used to supervise the procedure. The initial-alignment timer is started when the beam-tracking failure is determined. Upon starting the initial-alignment timer, the UE starts the initial alignment procedure. The initial-alignment timer is stopped if one beam of the serving cell is acquired. The UE begins communication with the base station through the new beam and continues monitoring to determine if beam-tracking failure is detected. If no beam acquired when the initial-alignment timer expired, the UE sends beam-tracking failure indication to upper layers of the UE indicating there is no beam available for communication in the serving cell.

In another embodiment, the initial beam alignment procedure used the dedicated resource if dedicated resource is available. The base station response is required if dedicated resource is used. The base station response can be scheduling information granted or assigned to the UE. The base station response can also be a MAC control element (CE). If there is no dedicated resource is available, the initial beam alignment procedure uses the random access process. Dedicated resource takes precedence over the random access process.

In yet another embodiment, a beam-switching request is used before the initial beam alignment procedure. The UE selects one or more control beam candidates, which each selected control beam satisfies one or more predefined criterion. In one embodiment, the criterion includes the signal strength or signal quality is higher than a predefined threshold, and the CSI or CQI is higher than a predefined threshold. If the UE cannot find any control beam satisfies the criterion, the UE would skip the beam-switching request procedure. If one or more qualified control beams were found, the UE would send one or more beam-switching request through the qualified control beams. In one embodiment, a beam-switching timer or a beam-switching counter is used to supervise the beam-switching request procedure. The beam-switching timer is started when the beam-switching request is sent. The beam-switching timer is stopped if the response for the beam-switching request is received. In one embodiment, the beam-switching response is a beam-switching command from the base station on the control beam where the beam-switching request is sent. The UE begins communication with the base station through the new beam and continues monitoring to determine if beam-tracking failure is detected. If no beam-switching response is received when the beam-switching timer expired, the UE starts the initial beam alignment procedure to recover the link.

In one embodiment, the beam-switching request uses dedicated resource. In another embodiment, the beam-switching request uses random access. Dedicated resource takes precedence over the random access process.

In one embodiment, the UE connects with a standalone mmW system. The mmW base station determines beam-tracking failure of a UE upon detecting missing HARQ feedbacks or the HARQ NACK is received continuously. The mmW base station starts to detect the beam-switching request from the UE. In another embodiment, the UE sends beam-tracking related information to the macro base station, which forwards the information to the corresponding mmW base station. In another embodiment, the UE is configured with dual connectivity and the UE sends beam-switching related information to the Macro eNB. The macro eNB forwards assistance signals to the mmW eNB to avoid blind detection at the mmW eNB.

In one novel aspect, beam-tracking failure handling procedure 193 handles received beam-tracking failure indicator by reestablishment of a new connection. In one embodiment, the UE is connected with a standalone mmW system. The beam-tracking failure indicator is a trigger event for the RRC connection re-establishment. In one embodiment, there is no macro layer configured for the UE. The UE performs the RRC connection re-establishment towards an mmW cell. In another embodiment, The UE knows there is macro layer available through measurement. The UE falls back to the macro layer upon detecting beam-tracking failure indicator. The UE performs RRC connection re-establishment towards the macro cell, which is considered as the default candidate cell for RRC connection re-establishment.

In yet another embodiment, the UE is configured with dual connectivity. The UE sends the beam-tracking failure indicator to the Macro base station. In one embodiment, the UE will not trigger the RRC re-establishment directly towards the mmW small cell. The macro base station would determine whether to release the mmW small cell. The UE continues the communication with macro base station.

Figure 2:
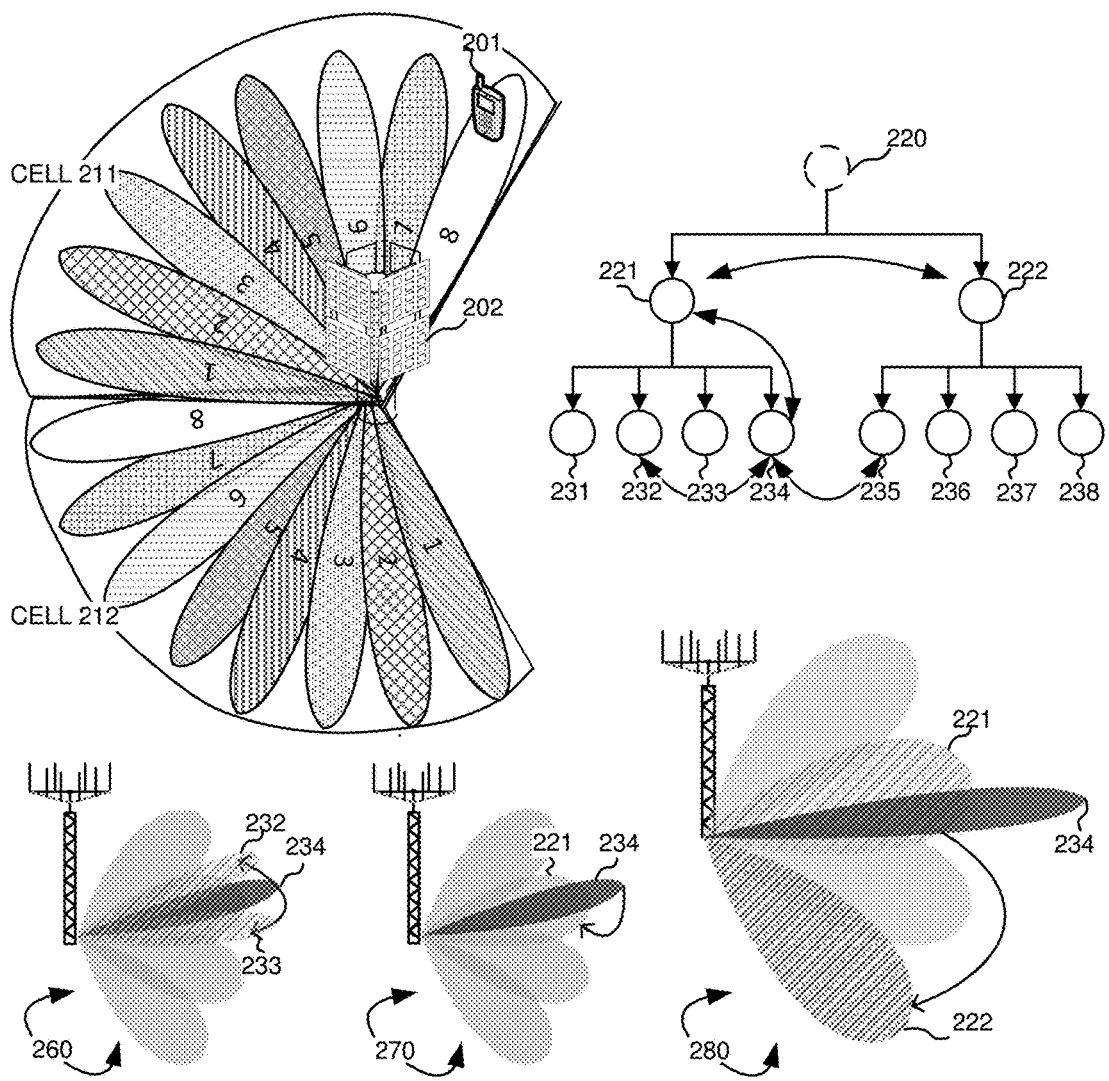
FIG. 2 illustrates an exemplary mmW wireless system with multiple control beams and dedicated beams in multiple directionally configured cells.

FIG. 2 illustrates an exemplary mmW wireless system with multiple control beams and dedicated beams in multiple directionally configured cells. A UE 201 is connected with an mmW eNB 202. mmW eNB 202 is directionally configured with multiple sectors/cells. Each sector/cell is covered by a set of coarse TX control beams. As an example, cells 221 and 222 are configured cells for mmW eNB 202. In one example, three sectors/cells are configured, each covering a 120° sector. In one embodiment, each cell is covered by eight control beams. Different control beams are time division multiplexed (TDM) and distinguishable. Phased array antenna is used to provide a moderate beam-forming gain. The set of control beams is transmitted repeatedly and periodically. Each control beam broadcasts the cell-specific information such as synchronization signal, system information, and beam-specific information. Besides coarse TX control beams, there are multiple dedicated beams, which are finer-resolution BS beams.

Beam tracking is an important function for the mmW mobile stations. Multiple beams, including coarse control beams and dedicated beams are configured for each of the directionally configured cells. The UE monitors the qualities of its neighboring beams by beam tracking. FIG. 2 illustrates exemplary beam tracking/switching scenarios. A cell 220 has two control beams 221 and 222. Dedicated beams 231, 232, 233 and 234 are associated with control beam 221. Dedicated beams 235, 236, 237 and 238 are associated with control beam 222. In one embodiment, the UE connected via beam 234, monitors its neighboring beams for control beam 234. Upon a beam-switching decision, the UE can switch from beam 234 to beam 232 and vice versa. In another embodiment, the UE can fall back to control beam 221 from dedicated beam 234. In yet another embodiment, the UE also monitors dedicated beam 235 configured for control beam 222. The UE can switch to dedicated beam 235, which belongs to another control beam.

FIG. 2 also illustrates three exemplary beam-switching scenarios 260, 270 and 280. UE 201 monitors neighboring beams. The sweeping frequency depends on the UE mobility. The UE detects dropping quality of the current beam when the current beam quality degrades by comparing with coarse resolution beam quality. The degradation may be caused by tracking failure, or the channel provided by refined beam is merely comparable to the multipath-richer channel provided by the coarse beam. Scenario 260 illustrates the UE connected with 234 monitors its neighboring dedicated beams 232 and 233 configured for its control beam, i.e. control beam 234. The UE can switch to beam 232 or 233. Scenario 270 illustrates the UE connected with 234 can fall back to the control beam 221. Scenario 280 illustrates the UE connected with 234 associated with control beam 221 can switch to another control beam 222.

Figure 3:
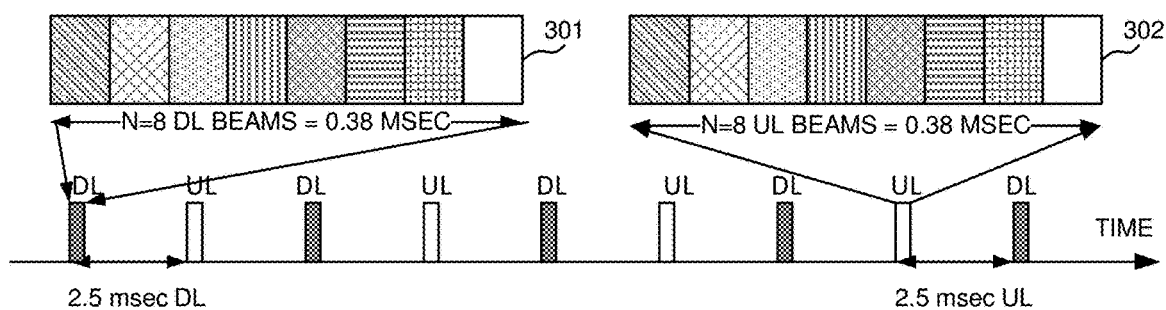
FIG. 3 illustrates an exemplary control beam configuration for UL and DL of the UE in accordance with the current invention.

FIG. 3 illustrates an exemplary control beam configuration for UL and DL of the UE in accordance with the current invention. A control beam is a combination of downlink and uplink resources. The linking between the beam of the DL resource and the beam of the UL resources is indicated explicitly in the system information or beam-specific information. It can also be derived implicitly based on some rules, such as the interval between DL and UL transmission opportunities. In one embodiment, A DL frame 301 has eight DL beams occupying a total of 0.38 msec. A UL frame 302 has eight UL beams occupying a total of 0.38 msec. The interval between the UL frame and the DL frame is 2.5 msec.

Figure 4:
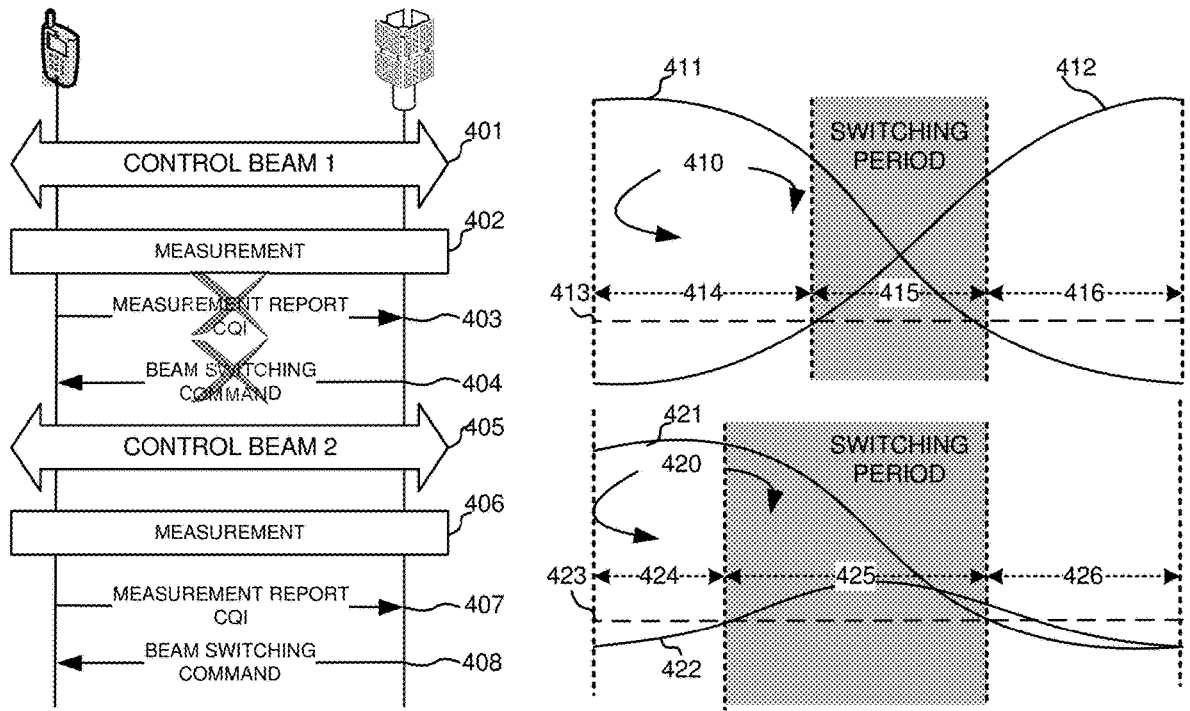
FIG. 4 illustrates exemplary flow chart and diagram of the beam-switching procedure in accordance with embodiments of the current invention.

FIG. 4 illustrates exemplary flow chart and diagram of the beam-switching procedure in accordance with embodiments of the current invention. A UE is connected with an mmW eNB. At step 401, the UE is connected with the eNB via control beam #1. At step 402, the UE monitors and measures link qualities. At step 403, the UE sends measurement report/CQI to the eNB. If the measurement report is received successfully, the eNB replies with a beam-switching command at step 404. In an mmW system, step 403 or step 404 may fail due to the fast fluctuation of the channel quality of mmW and rapidly adaptive beam tracking. Therefore, the data transmission or reception through the current beam will be interrupted until another beam is successfully acquired. When the UE receives the beam-switching command at step 404, the UE may switch to control beam #2 at step 405. Subsequently, at step 406, the UE starts performing measurement based on the new beam. At step 407, the UE sends measurement report/CQI to the eNB. At step 408, the eNB sends a beam-switching command to the UE if the current beam degrades.

FIG. 4 further illustrates an exemplary switching period for the beam-switching procedure. In scenario 410, two control beams 411 and 412 have different signal strength/quality varying by time. A signal strength/quality threshold 413 is configured for the UE. If the signal strength/quality of the UE went below threshold 413, the beam-switching procedure should be initiated. During period 414, the signal strength/quality of control beam 412 is below threshold 413. The beam switching procedure should not be performed during this period because switching to control beam 412 may fail due to the low signal strength of control beam 412. During period 415, the UE initiates the beam-switching procedure. Period 415 is also called the switching period. During this period, both control beam 411 and control beam 412 are above threshold 413. As signal quality of 411 continues going down while the signal quality of 412 continues going up, the UE can successfully switch to control beam 412 with a better quality. During period 416, signal quality of 411 drops to below threshold 413. The beam switching following the process in FIG. 4 may fail because the UE may not be able to receive successfully the beam-switching command due to its low signal strength. In one embodiment, the UE performs beam switching during the switching period based on predefined criterion, such as threshold 413.

In scenario 420, two control beams 421 and 422 have different signal strength/quality varying by time. A signal strength/quality threshold 423 is configured for the UE. During period 424, the signal strength/quality of control beam 422 is below threshold 423. The beam switching procedure should not be performed during this period because switching to control beam 422 may fail due to the low signal strength of control beam 422. During period 425, the UE can initiate the beam-switching process. Period 425 is also called the switching period. During this period, both control beam 421 and control beam 422 are above threshold 423. As signal quality of 411 continues going down while the signal quality of 412 continues going up, the UE can successfully switch to control beam 412 with a better quality. In scenario 420, though, the beam switching between control 421 and 422 eventual fails because during period 426, both control 421 and 422 may have signal strengths below threshold 423. Therefore, even if the UE successfully performed the beam switching, it may lost connection to both control beams during period 426. Additional beam handling procedures are needed.

Figure 5:
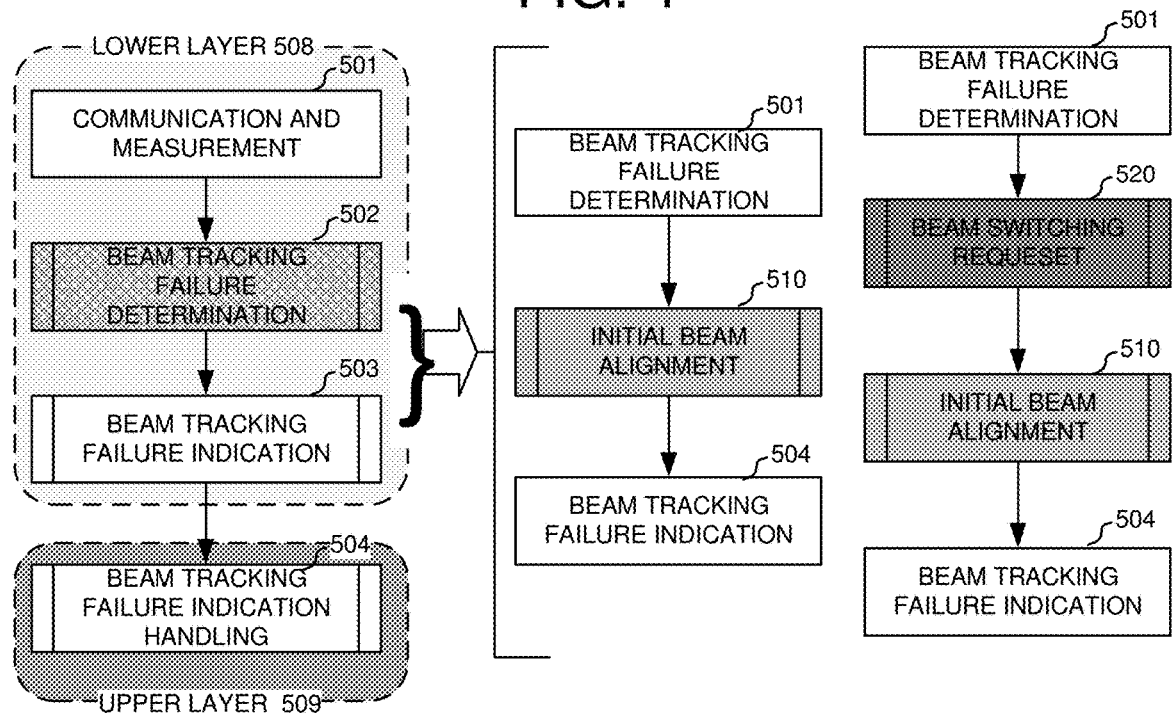
FIG. 5 illustrates exemplary procedures of handling beam tracking failure indication with different optional procedures in accordance with embodiments of the current invention.

FIG. 5 illustrates exemplary procedures of handling beam tracking failure indication with different optional procedures in accordance with embodiments of the current invention. The beam-tracking failure handling procedure includes a lower layer procedure 508 and an upper layer procedure 509. Lower layer procedure 508 includes steps 501, 502 and 503. Upper layer procedure 509 includes step 504. At step 501, the UE measures communication quality and communicates the measurement results to the eNB. At step 502, the UE performs beam-tracking failure determination. When a beam-tracking failure is determined, the UE sends a beam-tracking failure indication to upper layers at step 503. At step 504, upper layers of the UE perform beam-tracking failure indication handling.

In one embodiment, before sending the beam-tracking indication at step 503, a step 510 is performed after step 502. At step 510, an initial beam alignment procedure is performed such that the link can be recovered. In another embodiment, an additional step 520 is performed before the initial beam alignment procedure. At step 520, a beam-switching request is performed to try to recover the connection. If step 520 succeeded, the UE goes back to step 501 and continue monitoring the connection on the new beam. If step 520 failed, the UE moves to step 510 to perform the initial beam alignment procedure.

Figure 6:
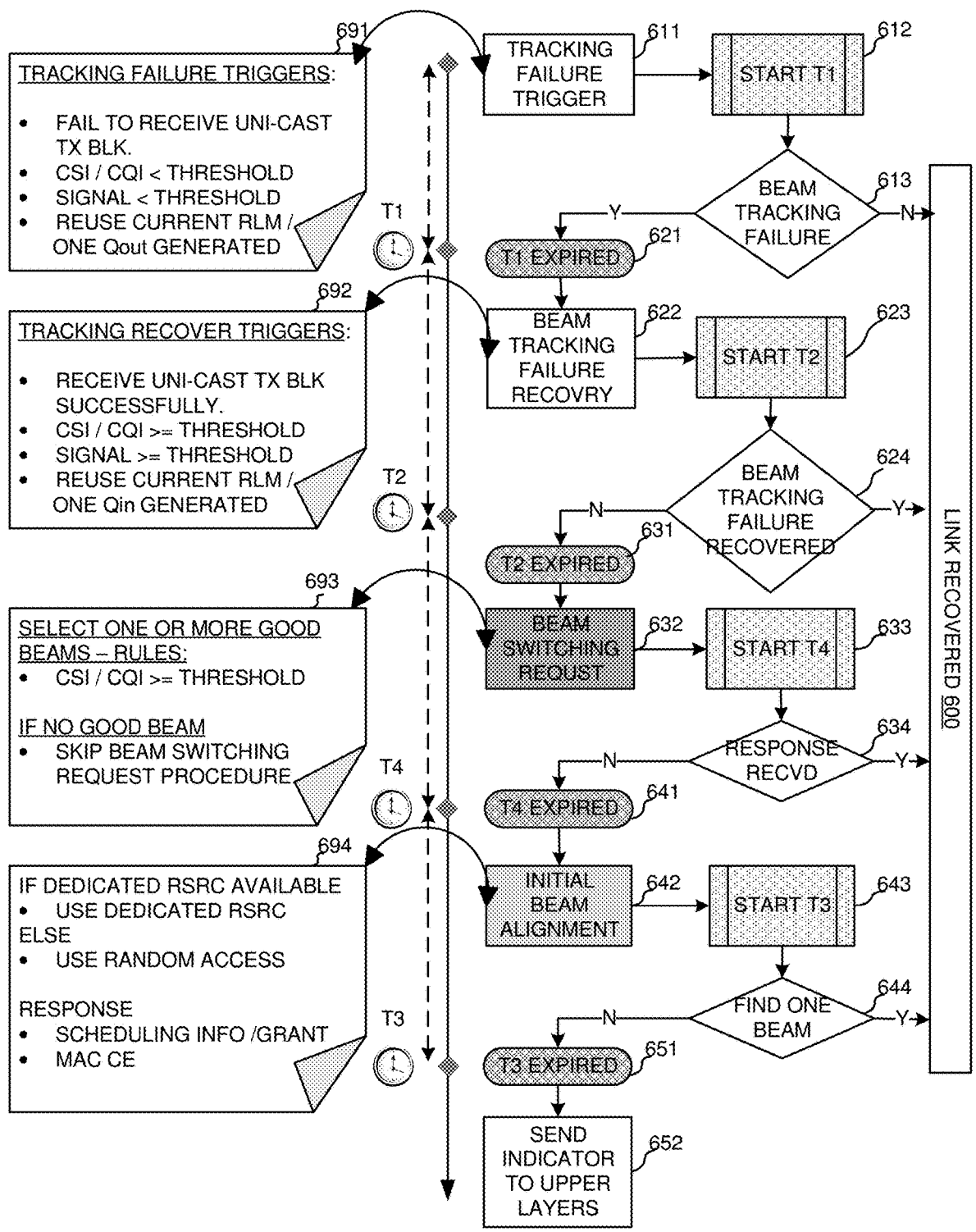
FIG. 6 shows an exemplary diagram of the timer-based beam recovery procedure in accordance with embodiments of the current invention.

In one novel aspect, several timers are used to supervise the procedures. FIG. 6 shows an exemplary diagram of the timer-based beam recovery procedure in accordance with embodiments of the current invention. At step 611, one or more lower-layer tracking failure triggers are detected. In one embodiment, a predefined trigger 691 has a set of beam conditions including fail to receive one or more unicast transport blocks, a measured channel status indicator (CSI) or a channel quality (CQI) indicator is lower than a predefined threshold, and a measured signal strength or quality is lower than a predefined threshold, and a reuse of current radio link management (RLM) procedure, one Qout is generated. At step 612, upon detecting the tracking failure triggers, the UE starts T1 timer. If at step 613, the UE determines that the beam tracking failure does not occur, the UE moves to a step 600, which puts the UE in the link-recovered state. At step 621, T1 timer expired and the beam tracking failure occurs. In one embodiment, the UE moves to step 622 to recover the beam tracking failure with an additional period. At step 623, the UE starts T2 timer. The link is determined to be recovered by detecting one or more recovery triggers 692, which has a set of recovery conditions including receiving one or more unicast transport blocks, a CSI or CQI indicator is higher than a predefined quality threshold, a measured signal strength or quality is higher than a predefined signal threshold, and the reuse of current radio link monitoring procedure, one Qin is generated. If, at step 624, the UE determines that the beam tracking failure is recovered, based on recover trigger events 692, the UE moves step 600, which puts the UE in the link-recovered state. At step 631, T2 timer expired and the beam tracking failure is not recovered. In one embodiment, the UE moves to step 632 to start the beam-switching request procedure. At step 633, the UE starts T4 timer. Rules 693 are used for the beam-switching request procedure. In one embodiment, the UE selects one or more good control beams based on good-beam rules, such as CSI/CQI greater than or equal to a predefined threshold. If there is no good beam found according to the rule, the UE will skip the beam-switching request procedure. If, at step 634, the UE determines that response for the beam-switching request is received the UE moves step 600, which puts the UE in the link-recovered state. At step 641, T4 timer expired and the link is not recovered. In one embodiment, the UE moves to step 642 to start the initial beam alignment procedure. At step 643, the UE starts T3 timer. Rules 693 are used for the initial beam alignment procedure. In one embodiment, the UE uses the dedicated resource if it is available. If there is no dedicated resource, the UE uses the random access procedure. When responses from base stations are required, the response can be carried in either scheduling information/grant or MAC CE. If at step 644, one beam is found the UE moves step 600, which puts the UE in the link-recovered state. At step 651, T3 timer expired and the link is not recovered. The UE moves to step 652 and sends beam-tracking failure indication to upper layers.

Figure 7:
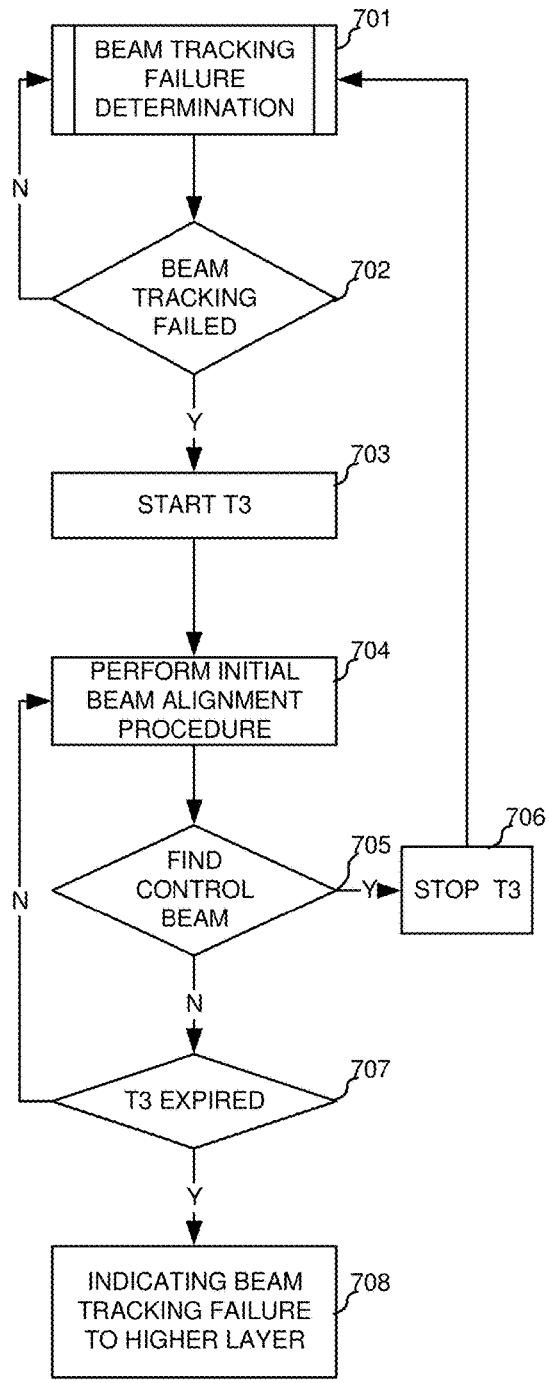
FIG. 7 shows an exemplary flow chart of the beam alignment as a recovery procedure in accordance with embodiments of the current invention.

FIG. 7 shows an exemplary flow chart of the beam alignment as a recovery procedure in accordance with embodiments of the current invention. At step 701, the UE performs the beam-tracking failure determination. At step 702, the UE determines whether the beam tracking failed. If step 702 determines no, the UE moves back to step 701. If step 702 determines yes, the UE moves to step 703 and starts T3 timer. At step 704, the UE performs the initial beam alignment procedure. At step 705, the UE determines if a control beam of the serving cell is acquired. If step 705 determines yes, the UE moves to step 706 and stops T3 timer. The UE subsequently moves back to step 701. If step 705 determines no, the UE moves to step 707 and determines if T3 timer expired. If step 707 determines no, the UE moves back to step 704. If step 707 determines yes, the UE moves to step 708 and sends beam-tracking failure indication to upper layers.

Figure 8:
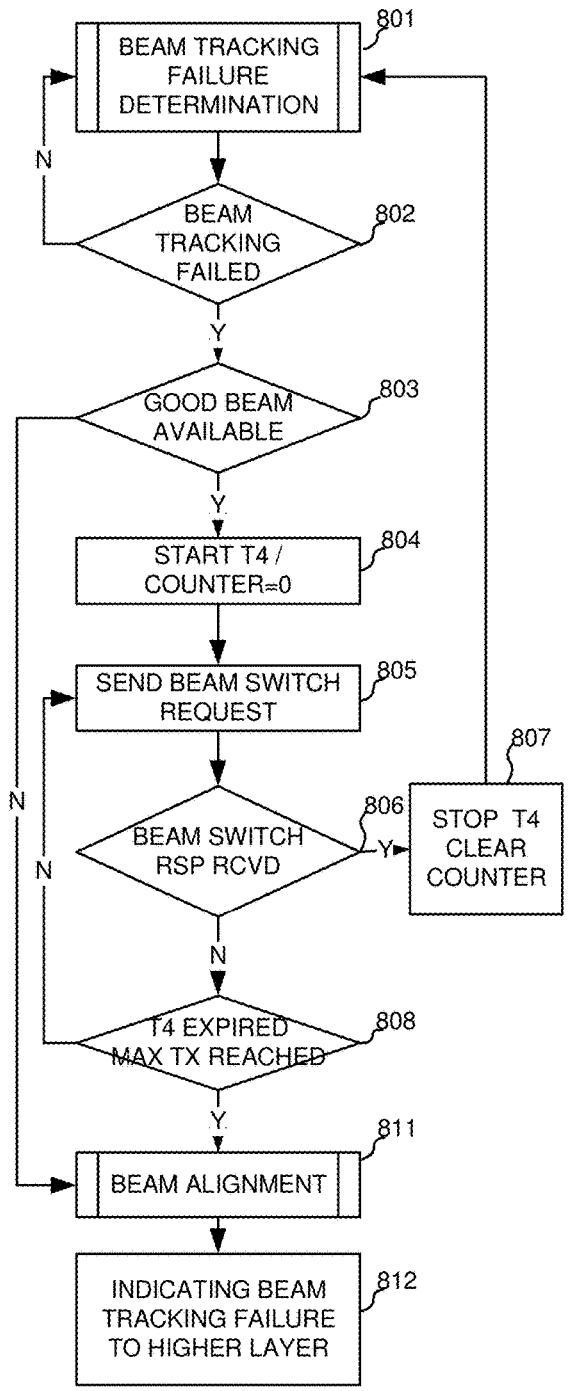
FIG. 8 shows an exemplary flow chart of the beam-switching request procedure as a recovery procedure in accordance with embodiments of the current invention.

FIG. 8 shows an exemplary flow chart of the beam-switching request procedure as a recovery procedure in accordance with embodiments of the current invention. At step 801, the UE performs the beam-tracking failure determination. At step 802, the UE determines whether the beam tracking failed. If step 802 determines no, the UE moves back to step 801. If step 802 determines yes, the UE moves to step 803 and determines if one or more good beams with good quality is available. If step 803 determines no, the UE moves to step 811 and starts the beam alignment procedure. If step 803 determines yes, the UE moves to step 804 to start the T4 timer and/or initialize a beam-switching counter to be zero. At step 805, the UE sends beams switching request on the selected beams. At step 806, the UE determines if the beam-switching response is received. If step 806 determines yes, the UE moves to step 807 and stops the T4 timer. The UE subsequently moves back to step 801. If step 806 determines no, the UE moves to step 808 and determines if the T4 timer expired and/or if the beam-switching counter reaches a predefined maximum number.

In one embodiment, only T4 timer is used to supervise the beam-switching procedure. In another embodiment, only the beam-switching counter is used to supervise the beam-switching request procedure. In one embodiment, when either T4 timer or the beam-switching counter is used, step 808 determines yes if the T4 timer is expired or the beam-switching counter reaches the predefined maximum number. The rules, the value of T4 timer and the maximum number of beam-switching count for step 808, can be preconfigured either by the network or by the UE, as well as dynamically configured.

If step 808 determines no, the UE moves back to step 805 and increase the beam-switching counter by one if the beam-switching counter is used. If beam-switching response is received in step 806, the beam-switching counter is cleared, and T4 timer is stopped. If step 808 determines yes, the UE moves to step 811 and starts the beam alignment procedure. If the beam alignment procedure fails, at step 812, the UE sends beam-tracking indicator to the higher layer.

In yet another embodiment, both T4 timer and the beam-switching counter are used. The counter is per each beam control beam. For each request try on one beam, the maximum number for the counter is set. T4 timer is used to supervise the multiple request trials on multiple control beams.

Figure 9:
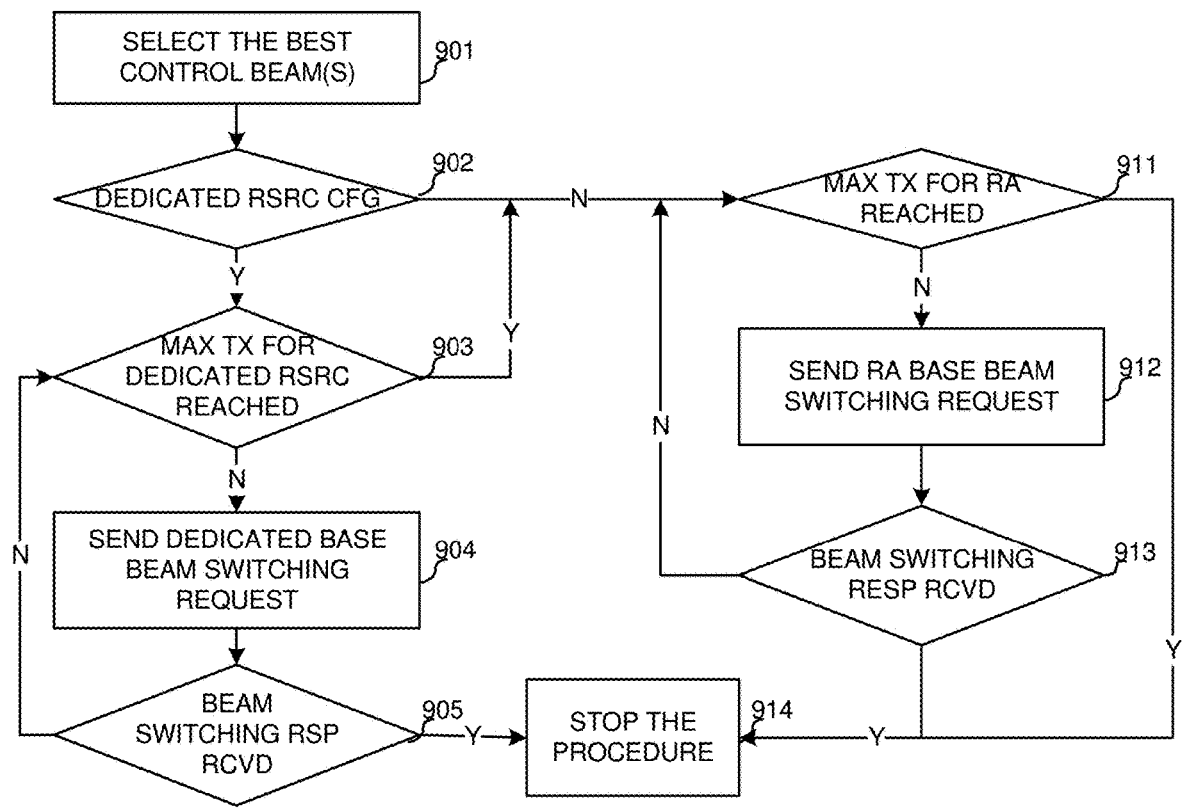
FIG. 9 shows an exemplary flow chart of choosing resources for the beam-switching request procedure in accordance with embodiments of the current invention.

FIG. 9 shows an exemplary flow chart of choosing resources for the beam-switching request procedure in accordance with embodiments of the current invention. In this example, beam-switching counter is used. At step 901, the UE selects one or more best-ranked control beams. At step 902, the UE determines if dedicated resource for beam-switching request is configured. If step 902 determines no, the UE moves to step 911 to detect if a RA beam-switching counter is greater than a maximum number of transmission for RA based request. If step 902 determines yes, the UE moves to step 903 and determines if a dedicated-resource beam-switching counter is greater than a maximum number of transmission for dedicated resource based request. If step 903 determines yes, the UE moves to step 911 to detect if a RA beam-switching counter is greater than a maximum number of transmission for RA based request. If step 903 determines no, the UE moves to step 904 and sends dedicated based beam-switching request. The UE moves step 905 and determines the beam-switching response is received. If step 905 determines yes, the UE moves to step 914 and terminates the procedure. If step 905 determines no, the UE increases the dedicated-resource beam-switching counter by one and moves back to step 903. At step 911, the UE determines if a RA beam-switching counter is greater than a maximum number of transmission for RA based request. If step 911 determines yes, the UE moves to step 914 and terminates the procedure. If step 911 determines no, the UE moves to step 912 and sends RA based beam-switching request. At step 913, the UE determines if the beam-switching response is received. If step 913 determines yes, the UE moves to step 914 and terminates the procedure. If step 913 determines yes, the UE increases the RA beam-switching counter by one and moves back to step 911.

Figure 10:
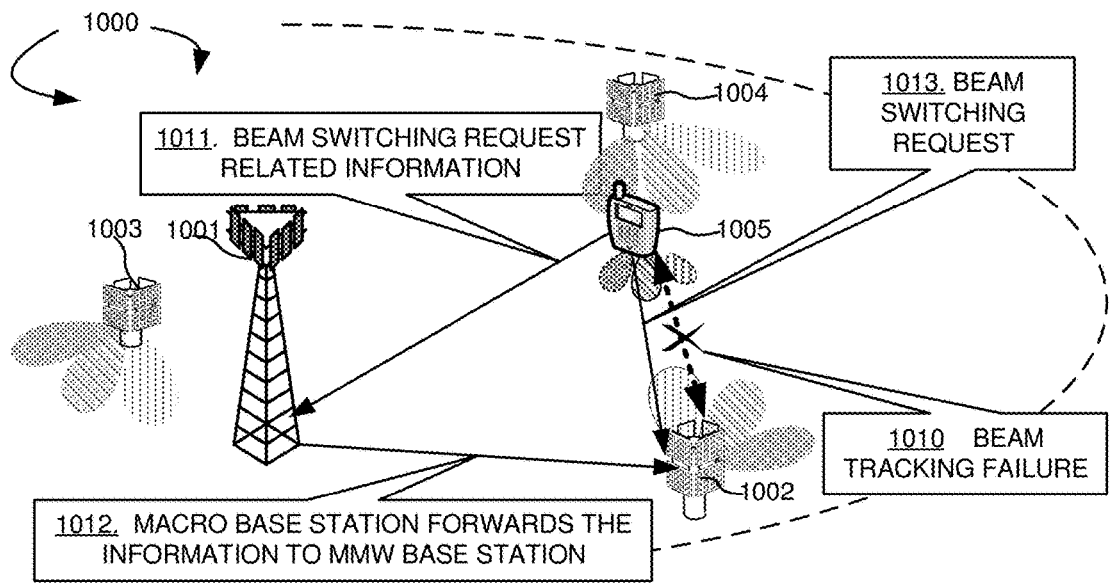
FIG. 10 illustrates an exemplary diagram for the macro base station assisted beam-switching request procedure in accordance with embodiments of the current invention.

FIG. 10 illustrates an exemplary diagram for the macro base station assisted beam-switching request procedure in accordance with embodiments of the current invention. A wireless system 1000 has a macro base station 1001 and multiple mmW base stations 1002, 1003 and 1004. UE 1005 is configured with dual connectivity and connected with base station 1002 and macro base station 1001. At step 1010, UE 1005 detects beam-tracking failure. At step 1011, UE 1005 sends beam-switching request related information to macro base station 1001. At step 1012, macro base station 1001 forwards the received information to mmW base station 1002. mmW base station 1002 upon receiving the switching request related information can perform the beam-switching procedure more efficiently because it does not need to constantly monitoring for the beam-switching requests from all UEs. At step 1013, UE 1005 sends the beam-switching request to mmW base station 1002.

Figure 11:
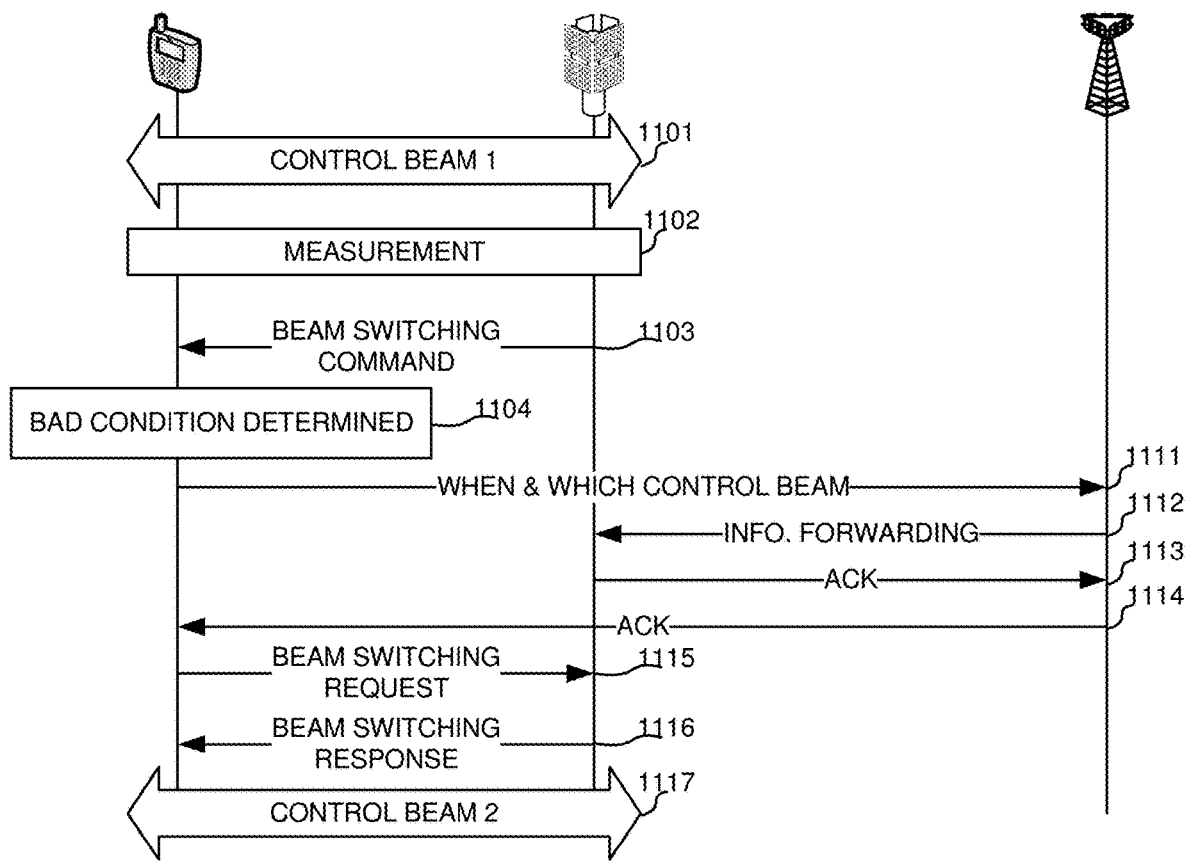
FIG. 11 shows an exemplary flow diagram for the macro-assisted beam-switching request procedure in accordance with embodiments of the current invention.

FIG. 11 shows an exemplary flow diagram for the macro-assisted beam-switching request procedure in accordance with embodiments of the current invention. At step 1101, the UE is connected with the mmW eNB on control beam #1. At step 1102, the UE measures signal qualities. At step 1103, the mmW eNB sends beam-switching command to the UE. At step 1104, a signal quality bad condition is determined. At step 1111, the UE sends the macro eNB beam switching related message indicating when and which control beam it intends to send beam-switching request. At step 1112, the macro eNB forwards the received information to the mmW eNB. At step 1113, the mmW eNB sends an ACK to the macro eNB. At step 1114, the macro eNB sends an ACK to the UE. At step 1115, the UE sends beam-switching request to the mmW eNB. At step 1116, the mmW eNB sends beam-switching response to the UE. At step 1117, the UE reconnects with the mmW eNB on control beam #2.

Figure 12:
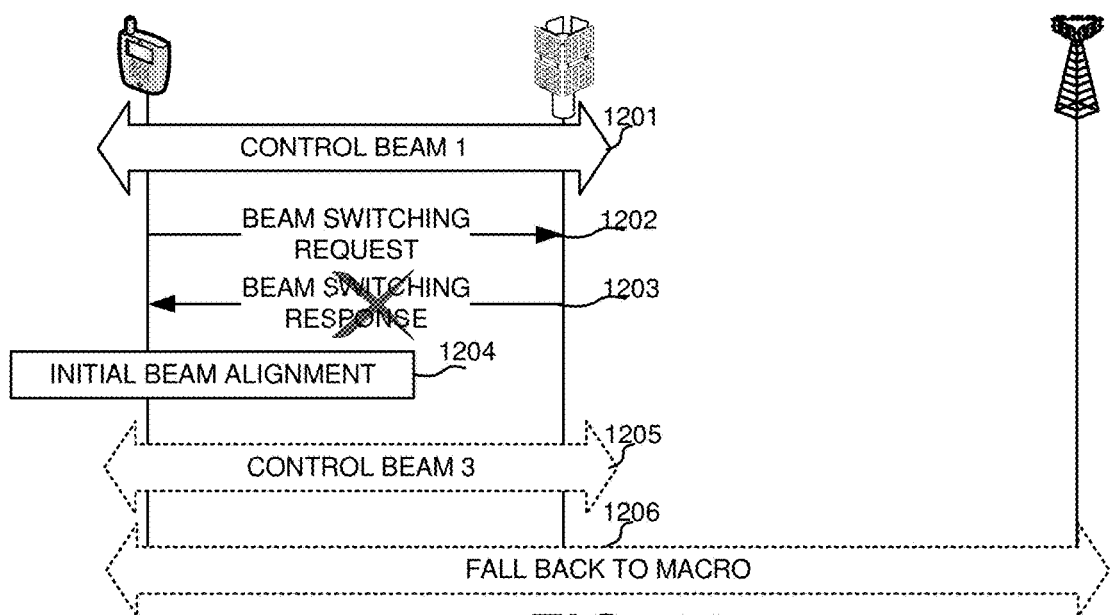
FIG. 12 shows an exemplary flow diagram for the UE with dual connectivity to fall back to the macro base station in accordance with embodiments of the current invention.

FIG. 12 shows an exemplary flow diagram for the UE with dual connectivity to fall back to the macro base station in accordance with embodiments of the current invention. At step 1201, the UE and the mmW eNB is connected on control beam #1. At step 1202, the UE sends beam-request to the mmW eNB. At step 1203, the UE is expecting the beam-switching response from the mmW eNB. However, the beam-switching response is not received. At step 1204, the UE starts initial beam alignment procedure. In some situations, the UE moves to step 1205 by successfully connecting to the mmW eNB via a new control beam #3. In another embodiment, the UE moves to step 1206 and falls back to macro eNB. In one novel aspect, the UE performs RRC connection reestablishment towards the macro eNB.

Figure 13:
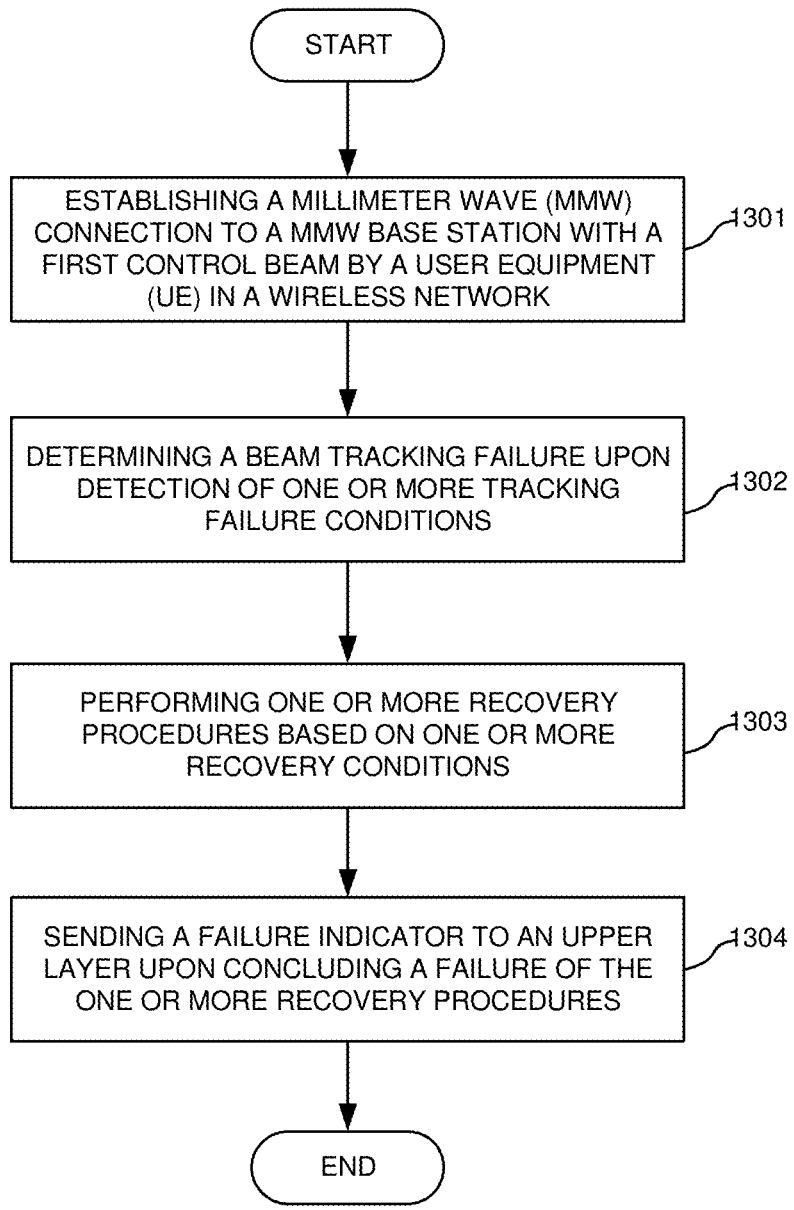
FIG. 13 shows an exemplary flow chart for the handling of intermittent disconnection in the mmW wireless system in accordance with embodiments of the current invention.

FIG. 13 shows an exemplary flow chart for the handling of intermittent disconnection in the mmW wireless system in accordance with embodiments of the current invention. At step 1301, the UE establishes a millimeter wave (mmW) connection to an mmW base station with a first control beam in a wireless network. At step 1302, the UE determines a beam tracking failure upon detection of one or more tracking failure conditions. At step 1303, the UE performs one or more recovery procedures based on one or more recovery conditions. At step 1304, the UE sends a failure indicator to an upper layer upon concluding a failure of the one or more recovery procedures.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   establishing a millimeter wave (mmW) connection to a mmW base station with a first control beam by a user equipment (UE) in a wireless network, wherein the UE is configured with one or more control beams and one or more dedicated beams;
   performing beam tracking and determining a beam tracking failure, wherein the beam tracking failure is determined when one or more tracking failure occurrences are detected by the UE;
   performing a recovery procedure based on one or more recovery conditions, wherein the recovery procedure succeeds upon detecting at least one of success conditions comprising: acquiring a new control beam, acquiring a new dedicated beam, and acquiring a new control beam and a new dedicated beam; and
   sending a failure indicator to an upper layer upon concluding a failure of the recovery procedure.

2. The method of claim 1, wherein the beam tracking failure is detected if one or more beam conditions occurred within a predefined period.

3. The method of claim 2, wherein the one and more beam conditions comprise: fail to receive one or more unicast transport blocks, a measured channel status indicator (CSI) or a channel quality (CQI) indicator is lower than a predefined threshold, a measured signal strength or quality is lower than a predefined threshold, and one out-of-sync is generated to higher layers reusing radio link monitoring (RLM) procedure.

4. The method of claim 2, further comprising: the tracking failure condition is recovered if one or more beam recover conditions occurred within a predefined period, wherein the beam condition comprises: success to receive one or more unicast transport blocks, a measured channel status indicator (CSI) or a channel quality (CQI) indicator is higher than a predefined threshold, a measured signal strength or quality is higher than a predefined threshold, and one in-sync is generated to higher layers reusing radio link monitoring (RLM) procedure.

5. The method of claim 1, wherein the recovery procedure is a beam alignment procedure, and wherein the UE acquires a second control beam of a serving cell for communication.

6. The method of claim 5, wherein UE uses a random access (RA) for the beam alignment procedure if dedicated resources are not available.

7. The method of claim 1, the recovery procedure is a beam switching request procedure that the UE sends a beam-switching request through a best control beam to a serving cell to request switching to the best control beam for communication.

8. The method of claim 7, wherein the UE selects one or more best control beams for the beam-switching requests, and wherein each selected control beam satisfies at least one predefined criteria.

9. The method of claim 1, wherein a radio resource control (RRC) connection reestablishment procedure is triggered upon receiving of the failure indicator by the upper layer.

10. An user equipment (UE), comprising:
    a transceiver that transmits and receives millimeter wave (mmW) signals from one or more mmW base stations wherein the UE is configured with one or more control beams and one or more dedicated beams;
    a beam tracker that performs beam tracking and determines a beam tracking failure, wherein the beam tracking failure is determined when one or more tracking failure occurrences are detected;
    a recovery module that performs a recovery procedure based on one or more recovery conditions, wherein the recovery procedure succeeds upon detecting at least one of success conditions comprising: acquiring a new control beam, acquiring a new dedicated beam, and acquiring a new control beam and a new dedicated beam; and
    a failure indicator handler that sends a failure indicator to an upper layer upon concluding a failure of the recovery procedure.

11. The UE of claim 10, wherein the beam tracking failure is detected if one or more beam conditions occurred within a predefined period.

12. The UE of claim 11, wherein the one or more beam conditions comprise: fail to receive one or more unicast transport blocks, a measured channel status indicator (CSI) or a channel quality (CQI) indicator is lower than a predefined threshold, a measured signal strength or quality is lower than a predefined threshold, and one out-of-sync is generated to higher layers reusing current radio link monitoring (RLM) procedure.

13. The UE of claim 10, wherein the recovery procedure is a beam alignment procedure, and wherein the UE acquires a second control beam of a serving cell for communication.

14. The UE of claim 13, wherein UE uses a random access (RA) for the beam alignment procedure if dedicated resources are not available.

15. The UE of claim 10, wherein the recovery procedure is a beam switching procedure that the UE sends a beam-switching request through a best control beam to a serving cell to request switching to the best control beam for communication.

16. The UE of claim 15, wherein the UE selects one or more best control beams for the beam-switching requests, wherein each selected control beam satisfies at least one predefined criteria.

17. The UE of claim 10, wherein a radio resource control (RRC) connection reestablishment procedure is triggered upon receiving of the failure indicator by the upper layer.

\* \* \* \* \*